US012451089B2

(12) United States Patent
Chang et al.

(10) Patent No.: US 12,451,089 B2
(45) Date of Patent: Oct. 21, 2025

(54) DISPLAY DEVICE AND DRIVING METHOD FOR DISPLAY DEVICE

(71) Applicant: Innolux Corporation, Miaoli County (TW)

(72) Inventors: Chih-Sheng Chang, Miaoli County (TW); Chien-Hao Kuo, Miaoli County (TW); Yu-Jyun Lyu, Miaoli County (TW)

(73) Assignee: Innolux Corporation, Miaoli County (TW)

( * ) Notice: Subject to any disclaimer, the term of this patent is extended or adjusted under 35 U.S.C. 154(b) by 0 days.

(21) Appl. No.: 18/787,959

(22) Filed: Jul. 29, 2024

(65) Prior Publication Data

US 2025/0069559 A1 Feb. 27, 2025

(30) Foreign Application Priority Data

Aug. 23, 2023 (CN) ........................ 202311067552.X

(51) Int. Cl.
*G09G 3/34* (2006.01)
*G09G 3/20* (2006.01)

(52) U.S. Cl.
CPC ......... *G09G 3/3426* (2013.01); *G09G 3/2007* (2013.01); *G09G 3/2092* (2013.01); *G09G 2320/0233* (2013.01); *G09G 2320/0686* (2013.01); *G09G 2340/16* (2013.01)

(58) Field of Classification Search
CPC .. G09G 3/3426; G09G 3/2007; G09G 3/2092; G09G 2320/0233; G09G 2320/0686; G09G 2340/16
See application file for complete search history.

(56) References Cited

U.S. PATENT DOCUMENTS

| | | | | |
|---|---|---|---|---|
| 2008/0238341 A1* | 10/2008 | Korcharz | G09G 3/3413 | 315/297 |
| 2008/0272999 A1* | 11/2008 | Kurokawa | G09G 3/3611 | 345/89 |
| 2009/0179849 A1* | 7/2009 | Wu | G09G 3/3426 | 345/102 |
| 2011/0012866 A1* | 1/2011 | Keam | G06F 3/0383 | 345/175 |
| 2012/0320107 A1* | 12/2012 | Murakami | G09G 3/3611 | 345/102 |
| 2015/0062103 A1* | 3/2015 | Tatsumi | G09G 3/3426 | 345/207 |

(Continued)

FOREIGN PATENT DOCUMENTS

TW 202223869 6/2022

*Primary Examiner* — Antonio Xavier
(74) *Attorney, Agent, or Firm* — JCIPRNET

(57) ABSTRACT

A display device and a driving method for the display device are provided. The display device includes a driving circuit, a backlight driving unit, and a display panel. The driving circuit receives a plurality of pieces of image data. The plurality of pieces of image data include first image data and second image data. The display panel receives a plurality of image display signals of the plurality of pieces of image data. The driving circuit compares the first image data and the second image data to generate a comparison result, and provides a backlight brightness adjustment command to the backlight driving unit according to the comparison result.

18 Claims, 5 Drawing Sheets

S200

(56) References Cited

U.S. PATENT DOCUMENTS

| | | | | |
|---|---|---|---|---|
| 2015/0235597 | A1* | 8/2015 | Meng | G09G 3/3426 345/102 |
| 2017/0018254 | A1* | 1/2017 | Chang | G09G 5/02 |
| 2018/0342213 | A1* | 11/2018 | Ikeda | G09G 3/3611 |
| 2020/0335047 | A1* | 10/2020 | Petrovich | G09G 3/3426 |
| 2021/0256914 | A1* | 8/2021 | Park | G09G 3/20 |
| 2023/0343266 | A1* | 10/2023 | Li | G09G 3/3406 |

* cited by examiner

DISPLAY DEVICE AND DRIVING METHOD FOR DISPLAY DEVICE

CROSS-REFERENCE TO RELATED APPLICATION

This application claims the priority benefit of China application serial no. 202311067552.X, filed on Aug. 23, 2023. The entirety of the above-mentioned patent application is hereby incorporated by reference herein and made a part of this specification.

BACKGROUND

Technical Field

The disclosure relates to a display device and a driving method for the display device, and particularly relates to a display device and a driving method that can improve the smear phenomenon.

Description of Related Art

A display device displays a dynamic image according to multiple pieces of image data. However, if the response speed of the display device is slow, then the smear phenomenon occurs in the visual effect of the display device under the high frame rate display requirement. The smear phenomenon reduces the viewing experience of the user. Therefore, how to improve the smear phenomenon of display devices is one of the research focuses of persons skilled in the art.

SUMMARY

The disclosure is directed to a display device and a driving method that can improve the smear phenomenon.

According to an embodiment of the disclosure, the display device includes a driving circuit, a backlight driving unit, and a display panel. The driving circuit receives multiple pieces of image data. The multiple pieces of image data include first image data and second image data. The backlight driving unit is electrically connected to the driving circuit. The display panel is electrically connected to the driving circuit. The display panel receives multiple image display signals of the multiple pieces of image data. The driving circuit compares the first image data and the second image data to generate a comparison result, and provides a backlight brightness adjustment command to the backlight driving unit according to the comparison result.

According to an embodiment of the disclosure, the driving method is used for a display device. The display device includes a backlight driving unit and a display panel. The display method includes the following. Multiple pieces of image data are received, in which the multiple pieces of image data include first image data and second image data. The first image data and the second image data are compared to generate a comparison result. An image display signal of the second image data is compensated according to the comparison result and a backlight brightness adjustment command is generated. The image display signal of the second image data is provided to the display panel, and the backlight brightness adjustment command is provided to the backlight driving unit.

Based on the above, the display device compares the first image data and the second image data to generate the comparison result, and provides the backlight brightness adjustment command to the backlight driving unit according to the comparison result. In this way, according to the comparison result, the smear phenomenon of the display device can be improved.

DESCRIPTION OF THE EMBODIMENTS

Figure 1:
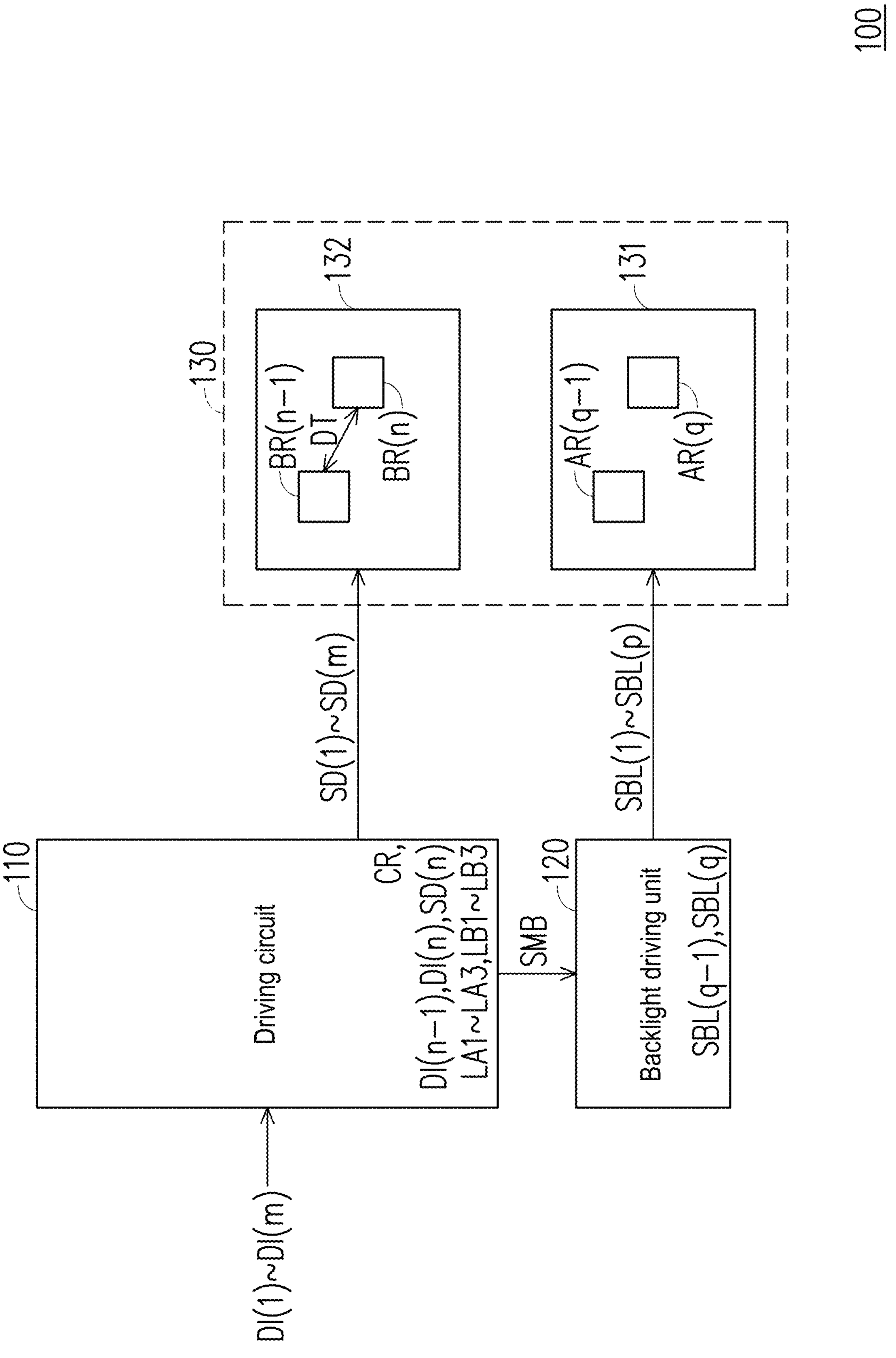
FIG. 1 is a schematic diagram of a display device according to an embodiment of the disclosure.

The disclosure may be understood by reference to the following detailed description with the accompanying drawings as below. It should be noted that, for the purpose of clarity and ease of understanding by the reader, each drawing of the disclosure depicts a portion of an electronic device, and certain elements in each drawing may not be drawn to scale. In addition, the number and size of each device depicted in the drawings are merely illustrative, and are not intended to limit the scope of the disclosure.

Certain terms are used throughout the description and the appended claims to refer to specific elements. As persons skilled in the art will understand, electronic device manufacturers may refer to elements by different names. This document does not intend to differentiate between elements that have different names rather than different functions. In the following description and the appended claims, the terms "include", "comprise", and "have" are used in an open-ended manner, and should be construed to mean "including but not limited to . . . " Therefore, when the terms "include", "comprise", and/or "have" are used in the description, the presence of a corresponding feature, area, step, operation, and/or element is indicated, but the presence of one or more corresponding features, areas, steps, operations, and/or elements are not limited.

It should be understood that when an element is referred to as being "coupled to," "connected to," or "conducted to" another element, the element may be directly connected to the other element and the electrical connection may be made directly, or an intermediate element may present between elements for relay electrical connection (indirect electrical connection). In contrast, when an element is referred to as being "directly coupled to," "directly connected to," or "directly conducted to" another element, the intermediate element does not present.

Although terms such as first, second, or third may be used to describe different component elements, such component elements are not limited by these terms. The terms are merely used to distinguish a component element from other component elements in the specification. The appended claims may not use the same terms, but may use the terms such as first, second, or third relative to the order required by the element. Therefore, in the following description, the first component element may be the second component element in the appended claims.

The electronic device according to the disclosure may include display devices, antenna devices, sensing devices, light emitting devices, touch displays, curved displays, or free shape displays, but not limited thereto. The electronic device may include bendable or flexible electronic devices. The electronic device may include, for example, liquid crystals, light emitting diodes, quantum dots (QDs), fluorescence, phosphor, other suitable display media, or combinations of the above materials, but not limited thereto. The light emitting diode may include, for example, an organic light emitting diode (OLED), a mini LED, a micro LED, or a quantum dot LED (may include QLED, QDLED), or other suitable materials, or combinations of the above, but not limited thereto. The display device may include, for example, a virtual reality (VR) display device, an augmented reality (AR) display device, a mixed reality display device, and a spliced display device, but not limited thereto. The antenna device may be, for example, a liquid crystal antenna, but not limited thereto. The antenna device may include, for example, an antenna splicing device, but not limited thereto. It should be noted that, the electronic device may be any arrangement and combination of the above, but not limited thereto. In addition, the shape of the electronic device may be a rectangle, a circle, a polygon, a shape having curved edges, or other suitable shapes. The electronic device may have peripheral systems such as drive systems, control systems, or light source systems to support the display device, the antenna device, or the splicing device, but the disclosure is not limited thereto. The sensing device may include a camera, an infrared sensor, or a fingerprint sensor, etc., and the disclosure is not limited thereto. In some embodiments, the sensing device may also include a flash, an infrared (IR) light source, other sensors, an electronic element, or a combination of the above, but not limited thereto.

In the disclosure, the embodiments use “pixel” or “pixel unit” as a unit used to describe a specific area containing at least one function circuit for at least one specific function. The area of a “pixel” depends on the unit used to provide a specific function. Adjacent pixels may share the same portion or wire, but may also contain specific portions of their own. For example, the adjacent pixels may share the same scan line or the same data line, but the pixels may also have transistors or capacitors of their own.

It should be noted that, the technical features in the different embodiments described below may be replaced, reorganized, or mixed with each other to form another embodiment without departing from the spirit of the disclosure.

Please refer to FIG. 1. FIG. 1 is a schematic diagram of a display device according to an embodiment of the disclosure. In this embodiment, a display device 100 includes a driving circuit 110, a backlight driving unit 120, and a display panel 130. In this embodiment, the display device 100 is, for example, a liquid crystal display device. The driving circuit 110 receives image data DI(1) to DI(m). The image data DI(1) to DI(m) is image data at different frame times respectively. The backlight driving unit 120 is electrically connected to the driving circuit 110. The display panel 130 is electrically connected to the driving circuit 110. The display panel 130 receives image display signals SD(1) to SD(m) of the image data DI(1) to DI(m). In this embodiment, the image display signal SD(1) corresponds to the image data DI(1). The image display signal SD(2) corresponds to the image data DI(2). By analogy, the image display signal SD(m) corresponds to the image data DI(m).

In this embodiment, the driving circuit 110 compares first image data DI(n−1) and second image data DI(n) among the image data DI(1) to DI(m) to generate a comparison result CR. “m” is a positive integer larger than “1”. “n” is a positive integer larger than “1” and smaller than or equal to “m”. Based on the display timing, the second image data DI(n) follows the first image data DI(n−1). That is to say, the driving circuit 110 compares two pieces of image data in adjacent timings to generate the comparison result CR. The driving circuit 110 provides a backlight brightness adjustment command SMB to the backlight driving unit 120 according to the comparison result CR. In this way, according to the comparison result CR, the smear phenomenon of the device 100 can be improved.

In this embodiment, the display panel 130 includes a backlight module 131. The backlight module 131 is electrically connected to the backlight driving unit 120. The backlight module 131 includes multiple areas. The backlight driving unit 120 generates brightness signals SBL(1) to SBL(p) corresponding to the multiple areas according to the backlight brightness adjustment command SMB. The backlight driving unit 120 provides the brightness signals SBL(1) to SBL(p) to the multiple corresponding areas, thereby improving the smear phenomenon.

In this embodiment, the backlight module 131 may be a backlight module having the local dimming technology. Each of the plurality of areas includes at least one light emitting unit. The at least one light emitting unit receives the corresponding brightness signal and emits light. In this embodiment, the backlight driving unit 120 is a driving element or circuit configured to drive the backlight module 131. The light emitting unit may be any type of light emitting diode.

In an embodiment, the brightness signals SBL(1) to SBL(p) may be voltage signals respectively. In another embodiment, the brightness signals SBL(1) to SBL(p) may be current signals respectively.

In this embodiment, the driving circuit 110 determines a first bright area BR(n−1) of the first image data DI(n−1) according to a first grayscale distribution of the first image data DI(n−1). The driving circuit 110 determines a second bright area BR(n) of the second image data DI(n) according to a second grayscale distribution of the second image data DI(n). The driving circuit 110 generates the comparison result CR according to the displacement change between the first bright area BR(n−1) and the second bright area BR(n). The driving circuit 110 performs a determination on the comparison result CR to decide whether to adjust (or compensate) the operation of the backlight driving unit 120. In this embodiment, the first bright area BR(n−1) and the second bright area BR(n) are respectively within the high brightness display area or the high grayscale value area in adjacent timings.

For example, based on the comparison result CR, when the driving circuit 110 determines that the displacement change between the first bright area BR(n−1) and the second bright area BR(n) may cause the smear phenomenon, this means that, when the area corresponding to the second bright area BR(n) has a high brightness or a high grayscale value, the area corresponding to the first bright area BR(n−1) still has a high brightness or a high grayscale value. Therefore, the driving circuit 110 provides the backlight brightness adjustment command SMB to the backlight driving unit 120. The backlight driving unit 120 adjusts the operation of the backlight driving unit 120 according to the backlight brightness adjustment command SMB, thereby improving the smear phenomenon.

For example, the first bright area BR(n−1) is positioned in an area AR(q−1) of the backlight module 131. The second bright area BR(n) is positioned in an area AR(q) of the backlight module 131. In other words, the bright area moves from the area AR(q−1) to the area AR(q). The backlight brightness adjustment command SMB commands the backlight module 131 to further reduce the luminous brightness of the area AR(q−1) (for example, to reduce the voltage value or current value of the brightness signal SBL(q−1)) and further increase the luminous brightness of the area AR(q) (for example, to increase the voltage value or current value of the brightness signal SBL(q)).

On the other hand, when the driving circuit 110 determines that the displacement change between the first bright area BR(n−1) and the second bright area BR(n) does not cause the smear phenomenon, the driving circuit 110 stops providing the backlight brightness adjustment command SMB. Therefore, the backlight driving unit 120 maintains normal operation.

In addition, in some embodiments, the driving circuit 110 may also provide the image display signals SD(1) to SD(m) to the display panel 130 according to the comparison result CR.

The display panel 130 includes a display module 132. The display module 132 is, for example, a liquid crystal display module. The display module 132 is electrically connected to the driving circuit 110. For example, when the driving circuit 110 determines that the displacement change between the first bright area BR(n−1) and the second bright area BR(n) may cause the smear phenomenon, the driving circuit 110 adjusts (or compensates) at least one piece of display data of the image display signal SD(n). Therefore, the grayscale value corresponding to the first bright area BR(n−1) in the display module 132 is further reduced. The grayscale value corresponding to the second bright area BR(n) in the display module 132 is further increased.

On the other hand, when the driving circuit 110 determines that the displacement change between the first bright area BR(n−1) and the second bright area BR(n) does not cause the smear phenomenon, the driving circuit 110 does not adjust the image display signal SD(n).

Figure 2:
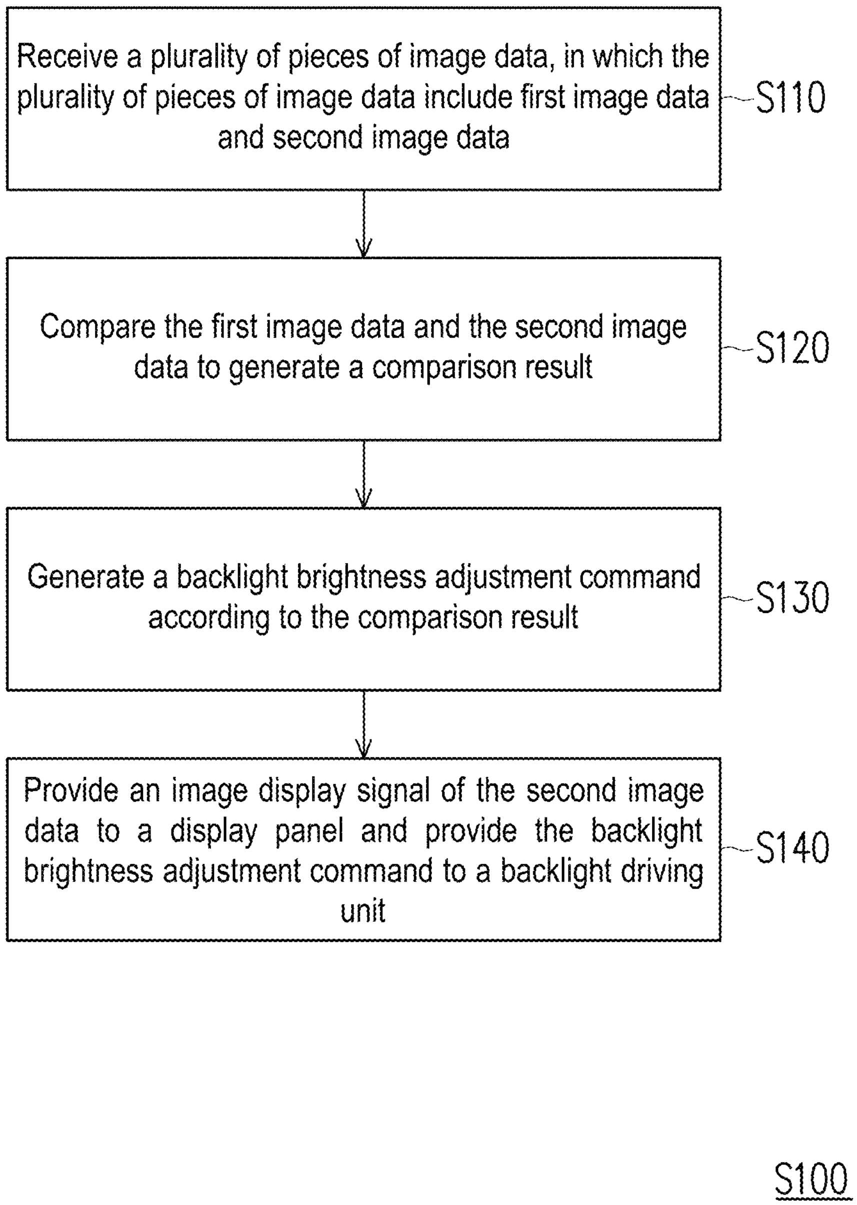
FIG. 2 is a flow chart of a driving method according to an embodiment of the disclosure.

Please refer to FIG. 1 and FIG. 2 at the same time. FIG. 2 is a flow chart of a driving method according to an embodiment of the disclosure. In this embodiment, a driving method S100 is used for the display device 100. The driving method S100 includes Steps S110 to S140. In Step S110, the driving circuit 110 receives the image data DI(1) to DI(m). In Step S120, the driving circuit 110 compares the first image data DI(n−1) and the second image data DI(n) among the image data DI(1) to DI(m) to generate the comparison result CR.

In Step S130, the driving circuit 110 generates the backlight brightness adjustment command SMB according to the comparison result CR and provides the backlight brightness adjustment command SMB to the backlight driving unit 120. In Step S140, the driving circuit 110 provides the image display signal SD(n) of the second image data DI(n) to the display panel 130. There may be, for example, no specific order in Step S130 and Step S140. In some embodiments, the driving circuit 110 may also adjust the image display signal SD(n) of the second image data DI(n) according to the comparison result CR, and provide the adjusted image display signal SD(n) to the display panel 130.

The implementation details of Step S110 to Step S140 have been described in detail in the embodiment of FIG. 1, and will not be repeated here.

Figure 3:
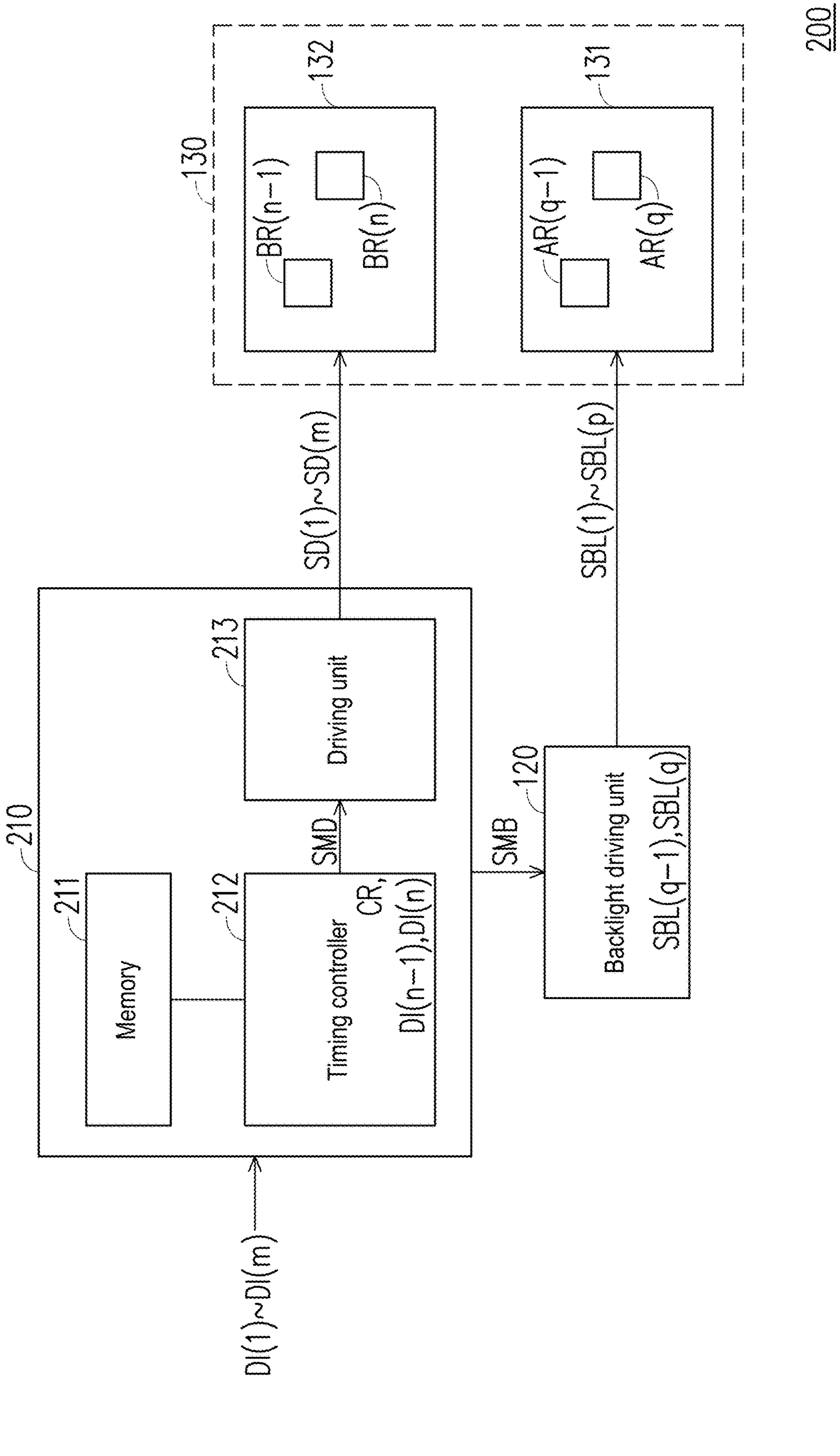
FIG. 3 is a schematic diagram of a display device according to an embodiment of the disclosure.

Through configuration structure and the driving method according to the disclosure, even if the user views the image of the display panel at a close distance, and/or has a high-resolution requirement for the display panel, the smear phenomenon of the display device can still be improved. For example, the display device according to the disclosure includes a virtual reality display device, an augmented reality display device, a mixed reality display device, and other suitable display devices, or a combination of the above. Please refer to FIG. 3. FIG. 3 is a schematic diagram of a display device according to an embodiment of the disclosure. In this embodiment, a display device 200 includes a driving circuit 210, the backlight driving unit 120, and the display panel 130. The implementation details of the backlight driving unit 120 and the display panel 130 have been described in detail in the embodiment of FIG. 1, and will not be repeated here. In this embodiment, the driving circuit 210 includes a memory 211, a timing controller 212, and a driving unit 213. The memory 211 stores the image data DI(1) to DI(m). The driving circuit 210 stores the received image data DI(1) to DI(m) into the memory 211. In this embodiment, the memory 211 may be implemented by a data storage circuit well known to persons skilled in the art. In some embodiments, the memory 211 may be disposed in the timing controller 212.

The timing controller 212 is electrically connected to the backlight driving unit 120 and the memory 211. In this embodiment, the timing controller 212 compares the first image data DI(n−1) and the second image data DI(n) to generate the comparison result CR, and is configured to provide the backlight brightness adjustment command SMB. In other words, the timing controller 212 provides the backlight brightness adjustment command SMB according to the comparison result CR. In addition, the timing controller 212 may also provide a display adjustment command SMD. In some embodiments, the timing controller 212 may provide the display adjustment command SMD according to the comparison result CR.

The driving unit 213 is electrically connected to the timing controller 212. The driving unit 213 receives the display adjustment command SMD provided by the timing controller 212, and provides the image display signal SD(n) of the second image data DI(n) to the display panel 130 according to the display adjustment command SMD. The driving unit 213 includes at least one of a source driver and a gate driver.

For example, based on the comparison result CR, when the timing controller 212 determines that the displacement change between the first bright area BR(n−1) and the second bright area BR(n) may cause the smear phenomenon, the timing controller 212 provides the backlight brightness adjustment command SMB to the backlight driving unit 120, and provides the display adjustment command SMD to the driving unit 213. The backlight driving unit 120 adjusts the luminous brightness of the area AR(q−1), AR(q) of the backlight driving unit 120 according to the backlight brightness adjustment command SMB. The driving unit 213 adjusts the image display signal SD(n) of the second image data DI(n) according to the display adjustment command SMD. Therefore, the smear phenomenon can be improved.

Figure 4:
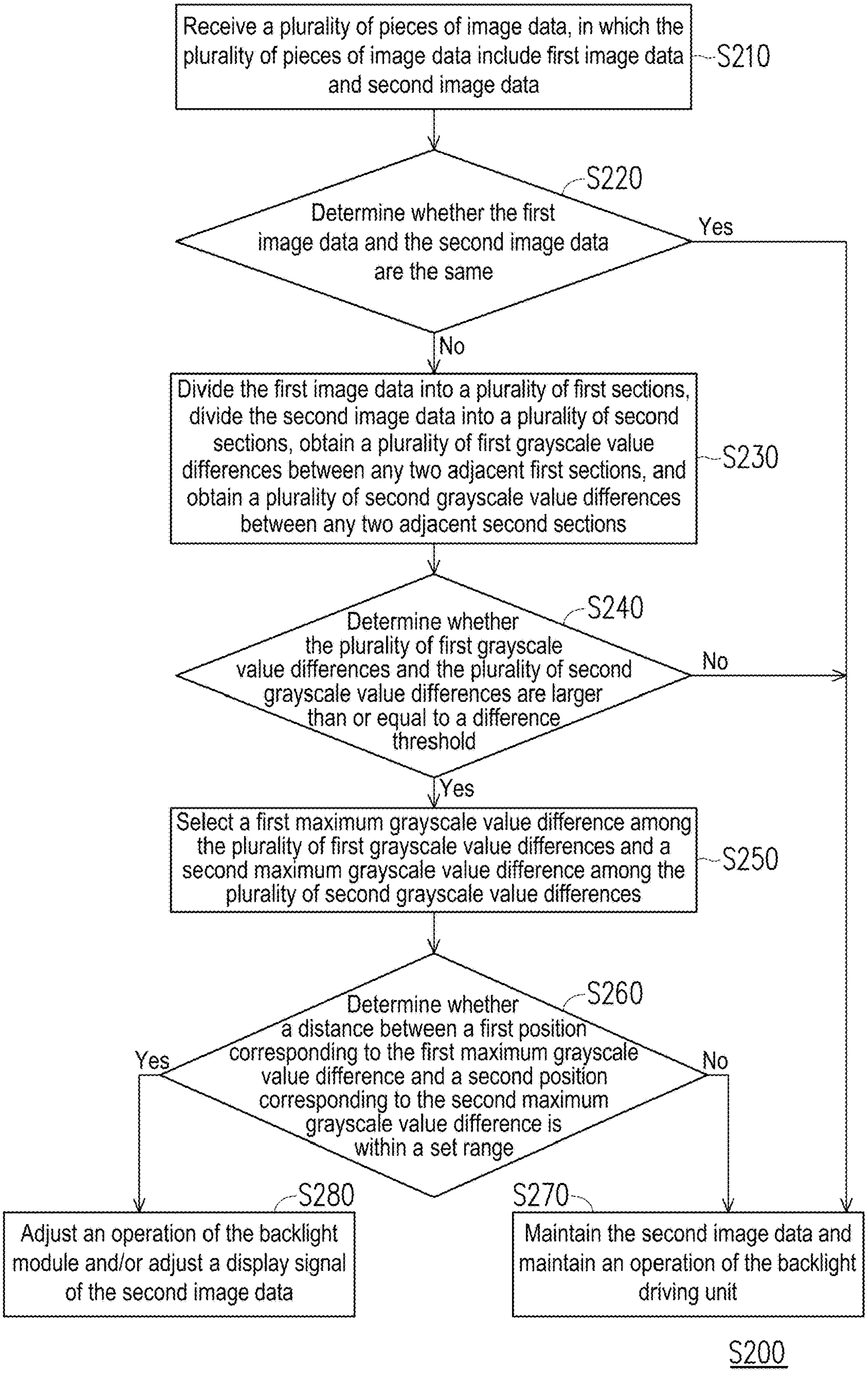
FIG. 4 is a flow chart of the driving method according to an embodiment of the disclosure.
Figure 5:
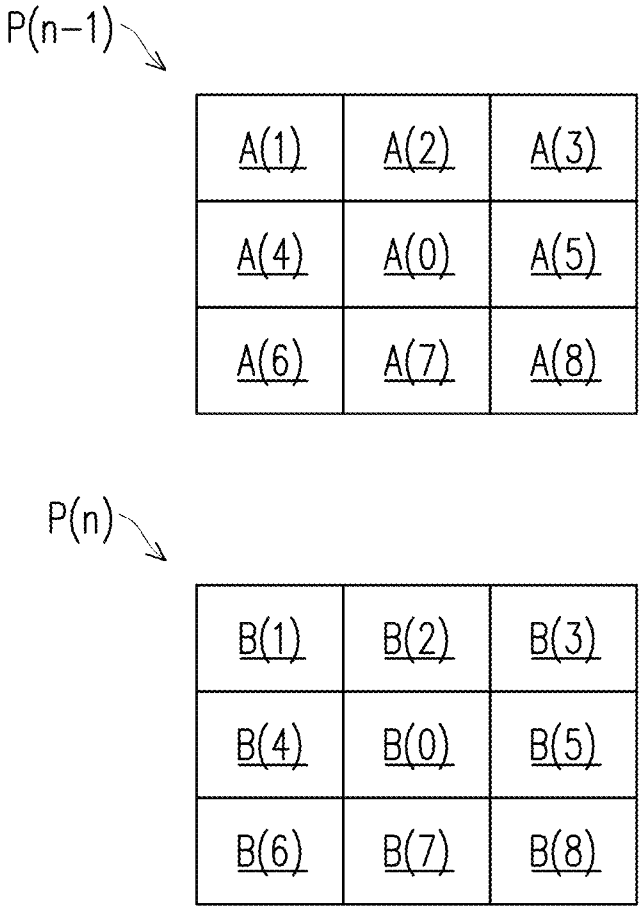
FIG. 5 is a schematic diagram of sections of a display panel according to an embodiment of the disclosure.

Please refer to FIG. 1, FIG. 4, and FIG. 5 at the same time. FIG. 4 is a flow chart of the driving method according to an embodiment of the disclosure. FIG. 5 is a schematic diagram of sections of a display panel according to an embodiment of the disclosure. In this embodiment, a driving method S200 is used for the display device 100. The driving method S200 includes Steps S210 to S280. In Step S210, the driving circuit 110 receives the image data DI(1) to DI(m) and stores the image data DI(1) to DI(m). In Step S220, the driving circuit 110 determines whether the first image data DI(n−1) and the second image data DI(n) are the same. When the first image data DI(n−1) and the second image data DI(n) are the same, this means that the images of the first image data DI(n−1) and the second image data DI(n) are still, and the smear phenomenon does not occur. Therefore, the driving circuit 110 maintains the second image data DI(n) and maintains the operation of the backlight driving unit 120 in Step S270. Therefore, the brightness signals SBL(1) to SBL(p) and the image display signal SD(n) are not adjusted or compensated.

On the other hand, when the first image data DI(n−1) and the second image data DI(n) are not the same, the driving circuit 110 divides the first image data DI(n−1) into multiple first sections, and divides the second image data DI(n) into multiple second sections in Step S230. The driving circuit 110 obtains multiple first grayscale value differences between any two adjacent first sections A(0) to A(8), and obtains multiple second grayscale value differences between any two adjacent second sections B(1) to B(8). Each first section and each second section may correspond to multiple pixels respectively. In some embodiments, the number of pixels corresponding to the first section A(0) may be different from the number of pixels corresponding to the first section A(1), but not limited thereto. In other embodiments, each first section or each second section corresponds to the same number of pixels.

In Step S230, the driving circuit 110 divides a portion P(n−1) of the first image data DI(n−1) into the first sections A(0) to A(8), and divides a portion P(n) of the second image data DI(n) into the second sections B(0) to B(8). The number of sections and the dividing method of the sections of the disclosure are not limited thereto. In this embodiment, the first section A(0) is the central section. Any area of the first sections A(1) to A(8) is adjacent to the first section A(0). The second section B(0) is the central section. Any area of the second sections B(1) to B(8) is adjacent to the first section B(0). In other words, being adjacent in the disclosure may be, for example, being horizontally adjacent, vertically adjacent, or obliquely adjacent. The driving circuit 110 subtracts the grayscale values of any two adjacent first sections and takes the absolute value to generate the multiple first grayscale value differences. For example, the driving circuit 110 subtracts the grayscale value of the first section A(2) from the grayscale value positioned in the first section A(1) and takes the absolute value to generate a first grayscale value difference LA1. The driving circuit 110 subtracts the grayscale value of the first section A(4) from the grayscale value positioned in the first section A(1) and takes the absolute value to generate a first grayscale value difference LA2. The driving circuit 110 subtracts the grayscale value of the first section A(0) from the grayscale value positioned in the first section A(1) and takes the absolute value to generate a first grayscale value difference LA3. By analogy, the driving circuit 110 may generate the multiple first grayscale value differences in this way, and will not be repeated here. The first grayscale value may be, for example, the average value of the multiple grayscale values generated by multiple pixels corresponding to the first section.

The driving circuit 110 subtracts the grayscale values of any two adjacent second sections B(0) and takes the absolute value to generate multiple second grayscale value differences. For example, the driving circuit 110 subtracts the grayscale value of the second section B(2) from the grayscale value of the second section B(1) and takes the absolute value to generate a second grayscale value difference LB1. The driving circuit 110 subtracts the grayscale value of the second section B(4) from the grayscale value positioned in the second section B(1) and takes the absolute value to generate a second grayscale value difference LB2. The driving circuit 110 subtracts the grayscale value of the second section B(0) from the grayscale value positioned in the second section B(1) and takes the absolute value to generate a second grayscale value difference LB3. By analogy, the driving circuit 110 may generate the multiple second grayscale value differences in this way, and will not be repeated here. The second grayscale value may be, for example, the average value of the multiple grayscale values generated by multiple pixels corresponding to the second section.

In Step S240, the driving circuit 110 determines whether the plurality of first grayscale value differences and the plurality of second grayscale value differences are larger than or equal to a difference threshold. When the multiple first grayscale value differences are all smaller than the difference threshold and/or the multiple second grayscale value differences are all smaller than the difference threshold, it means that the portion P(n−1) of the first image data DI(n−1) and/or the portion P(n) of the second image data DI(n) has no bright area at all. Therefore, the driving circuit 110 maintains the second image data DI(n) and maintains the operation of the backlight driving unit 120 in Step S270. Therefore, the brightness signals SBL(1) to SBL(p) and the image display signal SD(n) are not adjusted or compensated.

On the other hand, when at least one of the plurality of first grayscale value differences is larger than or equal to the difference threshold, and at least one of the plurality of second grayscale value differences is larger than or equal to the difference threshold, it means that the portion P(n−1) of the first image data DI(n−1) and the portion P(n) of the second image data DI(n) have at least one bright area. Therefore, the driving circuit 110 selects a first maximum grayscale value difference among the plurality of first grayscale value differences and a second maximum grayscale value difference among the second grayscale value differences in Step S250.

For example, if the first grayscale value difference LA1 is the first maximum grayscale value difference, and the grayscale value of the first section A(1) is larger than the grayscale value of the first section A(0), then this means that the first bright area BR(n−1) of the first image data DI(n−1) is positioned in the first section A(1). For example, if the second grayscale value difference LB1 is the second maximum grayscale value difference, and the grayscale value of the second section B(1) is larger than the grayscale value of the second section B(0), then this means that the second bright area BR(n) of the second image data DI(n) is positioned in the second section B(1).

In Step S260, the driving circuit 110 determines whether a distance DT between the first position (e.g., the first bright area BR(n−1)) corresponding to the first maximum grayscale value difference and the second position (e.g., the second bright area BR(n) corresponding to the second maximum grayscale value difference is within the set range. When the distance DT is outside the set range, it means that the distance DT between the first position and the second position is large. Therefore, in terms of visual effects, the first bright area BR(n−1) and the second bright area BR(n) are not related. Therefore, the smear phenomenon does not occur. The driving circuit 110 maintains the second image data DI(n) and maintains the operation of the backlight driving unit 120 in Step S270. Therefore, the brightness signals SBL(1) to SBL(p) and the image display signal SD(n) are not adjusted or compensated.

On the other hand, when the distance DT is within the set range, it means that the distance DT between the first position and the second position is small. Therefore, in terms of visual effects, the first bright area BR(n−1) moves to the second bright area BR(n). Therefore, the smear phenomenon may occur. The driving circuit 110 adjusts (or compensates) the operation of the backlight module 131 and/or adjusts the image display signal SD(n) of the second image data DI(n) in Step S280.

In this embodiment, the driving circuit 110 provides the backlight brightness adjustment command SMB to the backlight driving unit 120 in Step S280. The backlight driving unit 120 adjusts the operation of the backlight module 131 according to the backlight brightness adjustment command SMB. The detailed operation of the backlight module 131 to improve the smear phenomenon has been illustrated in the embodiment of FIG. 1, and will not be repeated here.

In this embodiment, the display panel 130 may also adjust the at least one piece of the display data of the image display signal SD(n) in Step S280 to improve the smear phenomenon. The detailed operation of the display module 132 to improve the smear phenomenon has been illustrated in the embodiment of FIG. 1, and will not be repeated here.

In summary, the display device compares the first image data and the second image data to generate the comparison result, and provides the backlight brightness adjustment command to the backlight driving unit according to the comparison result. In this way, based on the comparison result, the smear phenomenon of the display device can be improved. In some embodiments, the second image data can also be adjusted according to the comparison result.

Finally, it should be noted that, the above embodiments are merely used to illustrate the technical solution of the disclosure, rather than to limit the disclosure. Although the disclosure has been described in detail with reference to each of the foregoing embodiments, persons of ordinary skill in the art should understand that they can still modify the technical solutions recorded in each of the foregoing embodiments, or make equivalent substitutions for part of or all technical features thereof. However, these modifications or substitutions do not make the essence of the corresponding technical solution deviate from the scope of the technical solution in each embodiment.

What is claimed is:

1. A display device, comprising:

a driving circuit configured to receive a plurality of pieces of image data, wherein the plurality of pieces of image data comprise first image data and second image data;

a backlight driving circuit electrically connected to the driving circuit; and a display panel electrically connected to the driving circuit and configured to receive a plurality of image display signals of the plurality of pieces of image data;

wherein the driving circuit compares the first image data and the second image data to generate a comparison result, and provides a backlight brightness adjustment command to the backlight driving circuit according to the comparison result, wherein the driving circuit determines whether the first image data and the second image data are the same; and wherein in response to the first image data and the second image data being not the same, the driving circuit divides the first image data into a plurality of first sections, divides the second image data into a plurality of second sections, obtains a plurality of first grayscale value differences between any two adjacent first sections, and obtains a plurality of second grayscale value differences between any two adjacent second sections.

2. The display device as claimed in claim 1, wherein the driving circuit determines a first bright area of the first image data according to a first grayscale distribution of the first image data, and determines a second bright area of the second image data according to a second grayscale distribution of the second image data, and generates the comparison result according to a displacement change between the first bright area and the second bright area.

3. The display device as claimed in claim 1, wherein the display panel comprises:

a backlight module electrically connected to the backlight driving circuit, wherein the backlight module comprises a plurality of areas, wherein the backlight driving circuit generates a plurality of brightness signals corresponding to the plurality of areas according to the backlight brightness adjustment command, and provides the plurality of brightness signals to the plurality of corresponding areas.

4. The display device as claimed in claim 3, wherein each of the plurality of areas comprises:

at least one light emitting diode configured to receive the corresponding brightness signal.

5. The display device as claimed in claim 3, wherein the plurality of brightness signals are voltage signals respectively.

6. The display device as claimed in claim 3, wherein the plurality of brightness signals are current signals respectively.

7. The display device as claimed in claim 1, wherein the driving circuit provides the plurality of image display signals to the display panel according to the comparison result.

8. The display device as claimed in claim 1, wherein the driving circuit comprises:

a memory configured to store the plurality of pieces of image data.

9. The display device as claimed in claim 1, wherein the driving circuit comprises:

a timing controller configured to compare the first image data and the second image data to generate the comparison result and to provide the backlight brightness adjustment command according to the comparison result; and a driving unit electrically connected to the timing controller and configured to receive a display adjustment command provided by the timing controller, and to provide the plurality of image display signals to the display panel according to the display adjustment command, wherein the driving unit comprises at least one of a source driver and a gate driver.

10. A driving method used for a display device, wherein the display device comprises a backlight driving circuit and a display panel, and the display method comprises:

receiving a plurality of pieces of image data, wherein the plurality of pieces of image data comprise first image data and second image data;

comparing the first image data and the second image data to generate a comparison result, wherein comparing the first image data and the second image data to generate the comparison result comprises:

determining whether the first image data and the second image data are the same; and in response to the first image data and the second image data being not the same:

dividing the first image data into a plurality of first sections;

dividing the second image data into a plurality of second sections;

obtaining a plurality of first grayscale value differences between any two adjacent first sections; and obtaining a plurality of second grayscale value differences between any two adjacent second sections;

generating a backlight brightness adjustment command according to the comparison result and providing the backlight brightness adjustment command to the backlight driving circuit; and providing an image display signal of the second image data to the display panel.

11. The driving method as claimed in claim 10, wherein comparing the first image data and the second image data to generate the comparison result comprises:

determining a first bright area of the first image data according to a first grayscale distribution of the first image data;

determining a second bright area of the second image data according to a second grayscale distribution of the second image data; and generating the comparison result according to a displacement change between the first bright area and the second bright area.

12. The driving method as claimed in claim 11, wherein generating the comparison result according to the displacement change between the first bright area and the second bright area comprises:

determining whether a smear phenomenon occurs according to the displacement change.

13. The driving method as claimed in claim 10, wherein the display panel comprises a backlight module, wherein the backlight module comprises a plurality of areas, and the driving method further comprises:

generating a plurality of brightness signals corresponding to the plurality of areas according to the backlight brightness adjustment command by the backlight driving circuit and providing the plurality of brightness signals to the plurality of corresponding areas.

14. The driving method as claimed in claim 10, wherein comparing the first image data and the second image data to generate the comparison result further comprises:

in response to the first image data and the second image data being the same, maintaining the second image data and maintaining an operation of the backlight driving circuit.

15. The driving method as claimed in claim 10, wherein comparing the first image data and the second image data to generate the comparison result further comprises:

in response to the plurality of first grayscale value differences and the plurality of second grayscale value differences all being larger than or equal to a difference threshold, selecting a first maximum grayscale value difference among the plurality of first grayscale value differences and a second maximum grayscale value difference among the plurality of second grayscale value differences.

16. The driving method as claimed in claim 15, wherein comparing the first image data and the second image data to generate the comparison result further comprises:

in response to the plurality of first grayscale value differences all being smaller than the difference threshold and/or the plurality of second grayscale value differences all being smaller than the difference threshold, maintaining the second image data and maintaining the operation of the backlight driving circuit.

17. The driving method as claimed in claim 15, wherein comparing the first image data and the second image data to generate the comparison result further comprises:

determining whether a distance between a first position corresponding to the first maximum grayscale value difference and a second position corresponding to the second maximum grayscale value difference is within a set range; and in response to the distance exceeding the set range, maintaining the second image data and maintaining the operation of the backlight driving circuit.

18. The driving method as claimed in claim 17, further comprising:

in response to the distance being within the set range, adjusting the image display signal of the second image data.

* * * * *